United States Patent [19]
Hodgson

[11] 3,898,152
[45] Aug. 5, 1975

[54] ELECTROSTATIC WET OIL TREATER
[75] Inventor: Robert A. Hodgson, Tulsa, Okla.
[73] Assignee: Maloney-Crawford Tank Corporation, Tulsa, Okla.
[22] Filed: Nov. 5, 1973
[21] Appl. No.: 406,859

[52] U.S. Cl. .............. 204/308; 204/186; 204/188; 204/302
[51] Int. Cl. ............ B03c 5/02; B03c 5/00
[58] Field of Search ............ 204/302–308, 204/186–191

[56] References Cited
UNITED STATES PATENTS

| | | |
|---|---|---|
| 1,326,968 | 1/1920 | Rogers .......................... 204/308 X |
| 2,894,895 | 7/1959 | Turner .............................. 204/302 |
| 2,963,414 | 12/1960 | Waterman ........................ 204/302 |
| 3,458,429 | 7/1969 | Watson et al. .................... 204/302 |
| 3,616,460 | 10/1971 | Watson et al. .................... 204/302 |
| 3,649,516 | 3/1972 | Cole, Jr. et al. .................. 204/302 |

*Primary Examiner*—John H. Mack
*Assistant Examiner*—Aaron Weisstuch

[57] ABSTRACT

An electrostatic process and means for the removal of water from an oil-water emulsion and comprising the step of continuously flowing the oil-water emulsion through a series of divided wash trays, each said tray having a plurality of electrodes therein for creating an electrostatic field within the oil-water emulsion for stripping ionized water particles away from the oil.

16 Claims, 6 Drawing Figures

ELECTROSTATIC WET OIL TREATER

BACKGROUND OF THE INVENTION

1. Field of the Invention

This invention relates to electrostatic dehydration of oil-water emulsions and more particularly, but not by way of limitation, to an electrostatic wet oil treater which utilizes a plurality of treatment trays wherein the oil-water emulsion is allowed to flow in a continuous stream in constant contact with an electrode which creates an electrostatic field between the said electrode and the treatment trays whereby the ionized water particles are stripped from the oil-water emulsion.

2. Description of the Prior Art

Electric treaters heretofore utilized in separating water from oil normally have a limited exposure time of the wet oil to the electric field which has proven to be inefficient for allowing the ionized $H_2O$ particles to move to the electrode. Normally, such electrodes are in the form of a pair of spaced screens or the like through which the oil-water emulsion is allowed to rise or pass and is exposed to electric field for only a short period of time. If the said oil-water emulsion is held within the electric field for any great period of time the treating production rate is greatly decreased and hence oil production is decreased.

The normal method of electric treating found in the prior art by the use of such spaced perforated electrode plates is taught in the patent to Jarvis et al., U.S. Pat. No. 3,207,686, issued Sept. 21, 1965 and entitled "ELECTRIC DEHYDRATION" and also in the patent to Turner, U.S. Pat. No. 3,073,776, issued in Jan. 1963 and entitled "ELECTRIC TREATER." In those devices the only exposure of the oil-water emulsion to the electrostatic field is provided while the said emulsion is passing through the perforated electrodes. Again, this provides an insufficient exposure time of the wet oil to the electrodes.

SUMMARY OF THE INVENTION

The present invention utilizes a plurality of trays to provide for continuous flow of the oil-water emulsion therethrough. Each said tray is provided with an individual electrode insulated therefrom and an electrical potential difference is created between the said electrode and the tray, thereby creating an electrostatic field through the oil-water emulsion for stripping out the ionized water particles suspended in the oil. The trays may be configured to provide variable exposure times to the oil-water emulsion depending upon the ionized water content therein. Therefore, sufficient time may be allowed to provide for the ionized water particles to collect sufficient amounts to form globules of a size which will then descend out of the oil by simple gravity separation.

In addition to the electrostatic effect for separating the ionized water particles from the emulsion, the turbulence created by the oil-water emulsion flowing through the trays will further cause coalescence of the water droplets into larger globules which again will allow the said globules to descend and thereby separate from the oil. The sides of the trays are also extended downwardly by a sufficient amount to be in contact with the water itself or stated another way, the said trays may extend downwardly past the oil/water interface. Often, it is found that below the said interface there is a water-oil emulsion in which tiny oil particles may be suspended in the water. Again, this turbulent flow past the sides of the trays will tend to cause the said tiny oil particles suspended in the water to coalesce and form larger oil globules which will then ascend into the oil flow.

This electrostatic wet oil treating process and means is readily adaptable to ordinary heat treating devices and the like which makes it particularly desirable for further purification of crude oil and the like flowing therethrough. The oil-water emulsions which are particularly adaptable for this treater are of the type in which the continuous phase may be any oil such as crude oil and the dispersed phase may be water and/or water and sand and other solids or impurities. Means are also provided to insure that the oil/water interface will be controlled and kept at a level below that of the electrodes to prevent any shorting out between the electrodes and the trays.

DESCRIPTION OF THE DRAWINGS

Other and further advantageous features of the present invention will hereinafter more fully appear in connection with a detailed description of the drawings, in which.

DETAILED DESCRIPTION OF THE PREFERRED EMBODIMENTS

Referring to the drawings in detail, reference character 10 generally indicates an electrostatic wet oil treater which generally comprises an elongated horizontally disposed container 12 which is generally cylindrical in shape having closing end plates 14 and 16 at either end thereof. A vertically disposed partition plate 18 is disposed within the container 12 for partitioning off a separator compartment 20 adjacent to the end plate 14. On the opposite side of the partition plate 18 is a heating compartment generally indicated by reference character 22 and is provided with a transversely disposed furnace unit 24 disposed therein. An oil wash tray means generally indicated by reference character 26 is disposed within the container 12 between the heater compartment 22 and the end plate 16. A gas dome 28 is secured to the top of container 12 directly above the partition plate 18, the lower part of the gas dome 28 being divided by a baffle plate 30 which is connected along the lower edge thereof to the upper end of the partition plate 18 and extends upwardly into the gas dome part way.

The separator compartment 20 generally comprises a transversely disposed oil inlet pipe 32 having a plurality of spaced ports to allow the oil to flow outwardly therefrom. An inverted angle iron 34 is disposed along the top of the oil inlet pipe 32, the said angle iron 34 being provided with a plurality of perforations causing the oil-water emulsion to flow into the compartment 20 in a dispersed manner. A generally horizontally disposed partition plate 36 is secured along one edge thereof to the partition plate 18 and slants downwardly toward the end plate 14, so that free water with the oil water emulsion may flow down the inclined partition plate 36 into the lower area of the separation compartment 20.

A downwardly extending baffle plate 38 is secured along the upper edge thereof to the bottom of the partition plate 36. A second baffle plate 40 is secured to the bottom of the container 12 adjacent to the partition plate 18 and extends upwardly therefrom to a position below that of the inclined partition plate 35. The inclined partition plate 36 is provided with an upwardly extending up-comer pipe or riser pipe 42, the lower end of said pipe 42 being secured to the inclined partition plate 36, and the inside of the said riser pipe 42 being in open communication with the lower portion of the separator compartment 20.

The oil-water emulsion entering the inlet pipe 32 therefore flows upwardly through the water in compartment 20 while free water with some entrained oil flows down the inclined partition plate 36 into the lower compartment. The oil and free water then begins to separate as it flows past the downwardly extending baffle 38. As the oil begins to separate from the water between the baffle plates 38 and 40 the lighter oil will tend to rise and be pushed upwardly through the riser pipe 42 as more oil water mixture is pumped into the separator compartment 20, thereby forming an oil-water interface within the separator compartment 20 along the upper portion thereof as generally indicated by the line, reference character 44. Excess water in the lower portion of the separator compartment 20 may then be siphoned off by any well known means (not shown).

Gases that accompany the flow of the oil mixture into the compartment 20 may then escape from the compartment 20 through the gas dome 28 over the baffle 30 located therein. The said gases may then be removed from the container 12 by means of a mist extractor 46 which is located at the top of the container 12 near the end plate 16. The mist extractor 46 may be provided with baffle means therein for removing any liquid that may be entrained in the gas passing therethrough. A safety connection or safety valve 48 is provided in the top of the container 12 adjacent to the mist extractor to maintain sufficient gas pressure to drive oil and water from the treater.

Figure 2:
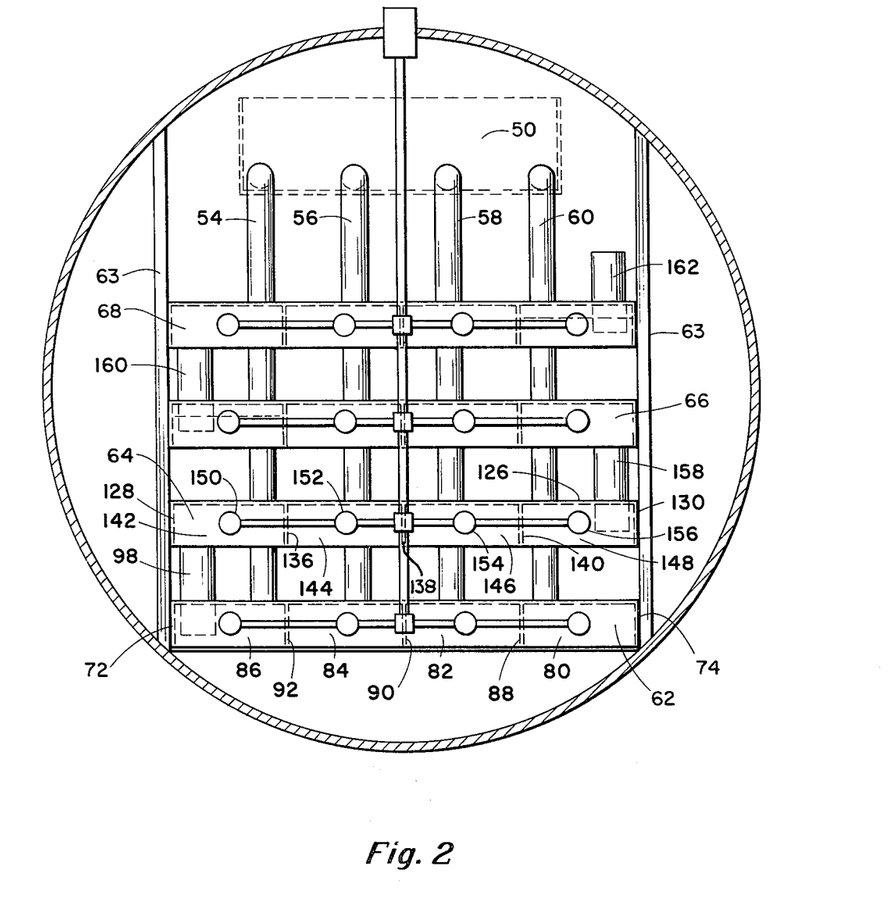
FIG. 2 is an end elevational sectional view of the container and treater of FIG. 1.

A oil-water emulsion outlet skimmer tray 50 is transversely disposed in the upper portion of the separator compartment 20 and is secured to the partition plate 18. The tray 50 is provided with upwardly extending walls 52 therein which allows only the most pure oil-water emulsion near the top of the separator compartment 20 to flow over the said walls 52 into the tray 50. Oil-water transfer pipes 54, 56, 58 and 60 (FIG. 2) are connected to the partition plate 18, the said pipes 54, 56, 58 and 60 being in open communication with the tray 50 and disposed directly above the said tray 50. The said pipes 54, 56, 58 and 60 then pass over and adjacent to the furnaces 24 and then downwardly in open communication with the lowermost tray of the wash trays 26. Since the pipes 54, 56, 58 and 60 pass near the furnaces 24, the oil-water emulsion carried by the said pipes is heated before passing into the tray means 26.

The oil wash tray means 26 generally comprises a plurality of flat horizontal tray means 62, 64, 66 and 68 which are vertically spaced between the heater compartment 22 and the end plate container 16. The lowermost tray means 62 is provided with an elongated horizontally disposed flat tray plate 70 having oppositely disposed downwardly extending side walls 72 and 74 (FIG. 3) and oppositely disposed end walls 76 and 78. The oil-water emulsion inlet pipes 54, 56, 58 and 60 from the separation compartment 20 are secured to the plate 70 at one end thereof adjacent to the end wall 76. The pipes 54, 56, 58 and 60 extend through the plate 70 in open communication with the interior of said tray.

Figure 1:
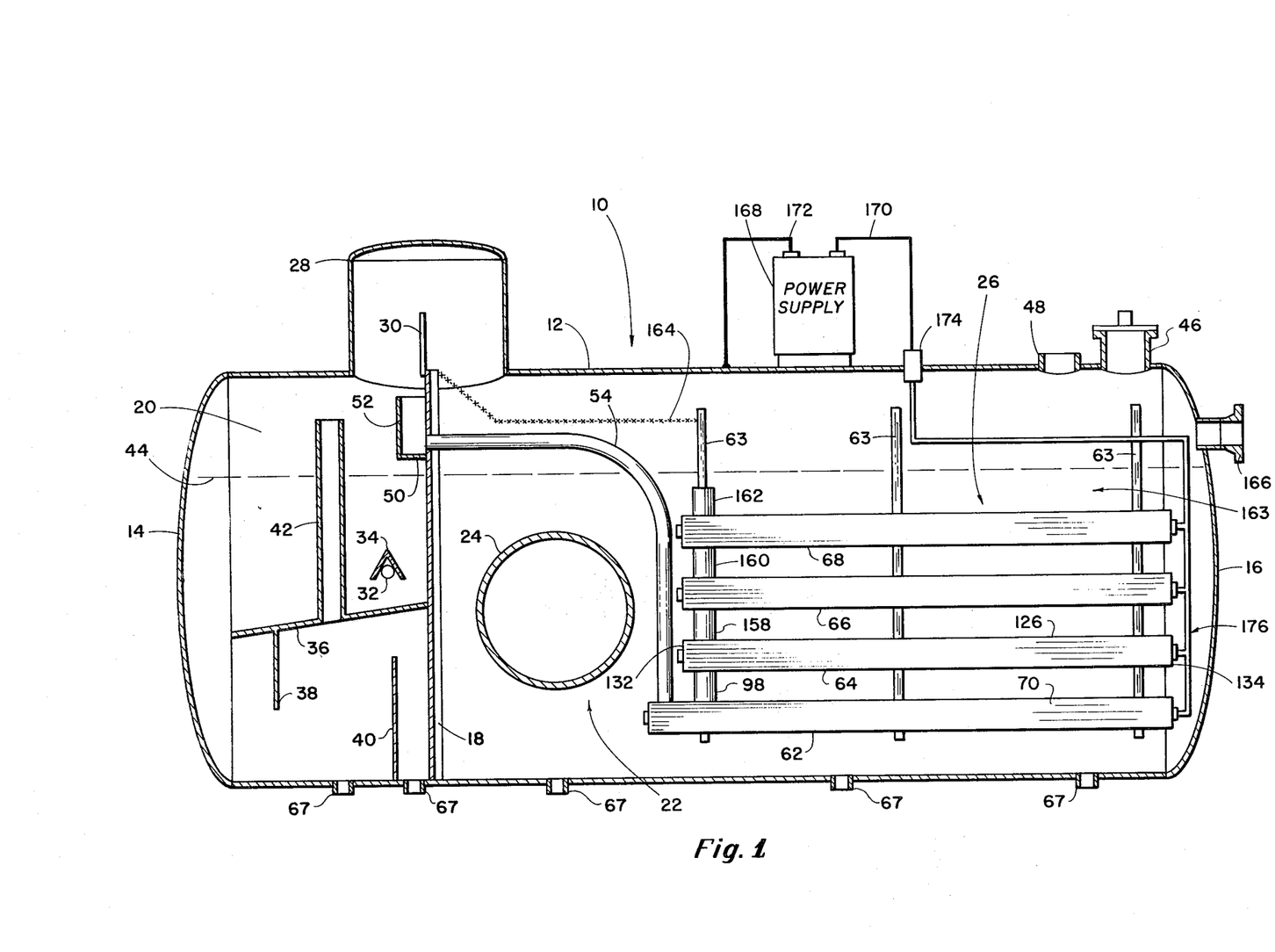
FIG. 1 is an elevational sectional view of a container having an electrostatic treater therein which embodies the present invention.

A plurality of vertically disposed standards 63 (FIG. 1) are secured within the vessel 12 and the tray means 62, 64, 66 and 68 are secured thereto and held in place within the container by the said standards 63.

The tray 62 (FIG. 2) is divided into a plurality of elongated longitudinally disposed flow channels 80, 82, 84 and 86 which are separated by longitudinally disposed downwardly extending partition plates 88, 90 and 92, respectively. The channels 82, 84 and 86 are closed at one end by a partition plate 94 (FIG. 3) which is disposed parallel to the end wall 76 and located adjacent thereto. The partition plate 88 is connected at one end thereof to the plate 94 and extends toward the end wall 78, the end of the said partition plate 88 being spaced from the end plate 78, (FIG. 3) thereby allowing the tray channel 80 (FIG. 2) to be in open communication with the tray channel 82 around the end of the partition plate 88. The partition plate 90 is connected at one end thereof to the end wall 78 and extends longitudinally toward the end plate 94 but is spaced therefrom, thereby allowing open communication between the tray channel 82 and 84 around one end of the partition plate 90. The partition plate 92 is secured at one end thereof to the plate 94 and extends toward the end wall 78 but is spaced therefrom, thereby allowing open communication between the tray channels 84 and 86 around the end of the separation partition plate 92.

Figures 3, 4, 5:
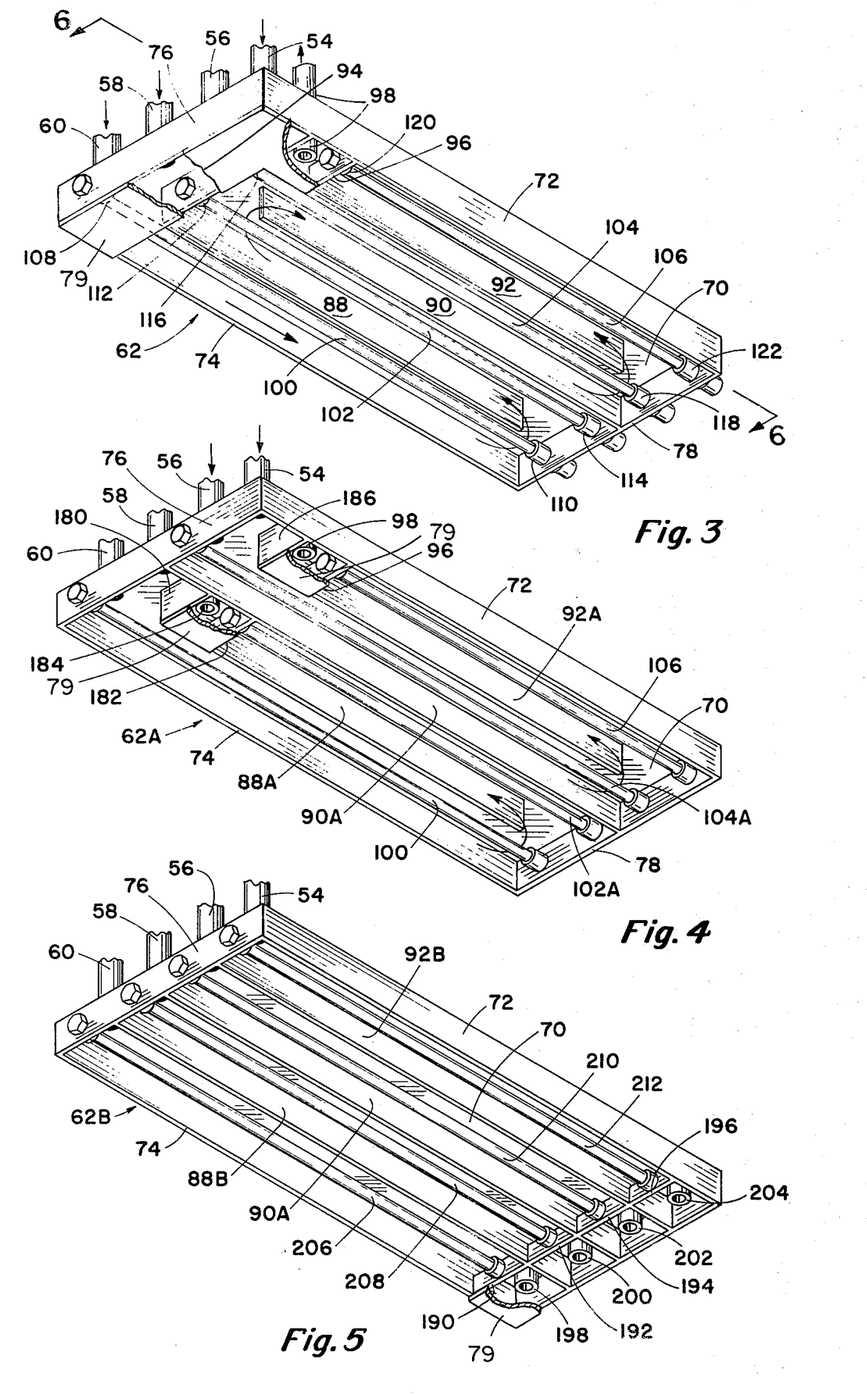
FIG. 3 is a perspective view of one of the trays of FIG. 1 which are configured for maximum oil-water emulsion retention time.
FIG. 4 is a perspective view of a tray which is configured for half the retention time as that tray shown in FIG. 3.
FIG. 5 is a perspective view of a tray which is configured for one-fourth the retention time as that tray shown in FIG. 3.

The tray channel 86 is partially blocked at one end thereof adjacent to the plate 94 by a baffle member 96 (FIG. 3). The baffle plate 96 is connected between the partition plate 92 and the side wall 72 adjacent to the bottom edges thereof and extends upwardly toward the horizontally disposed tray plate 70 but spaced therefrom. A vertically disposed riser pipe 98 is secured through the plate 70 of the tray means 62 and extends dowwardly into the tray channel 86 between the plate 94 and the baffle 96. The lower end of the riser pipe 98 extends well below the midportion of the baffle plate 96 but is spaced from the lower edge of the tray walls. The upper end of the riser pipe 98 is operably connected in open communication with the interior of the tray means 64 which is located directly above the tray means 62 and spaced therefrom.

Figure 6:
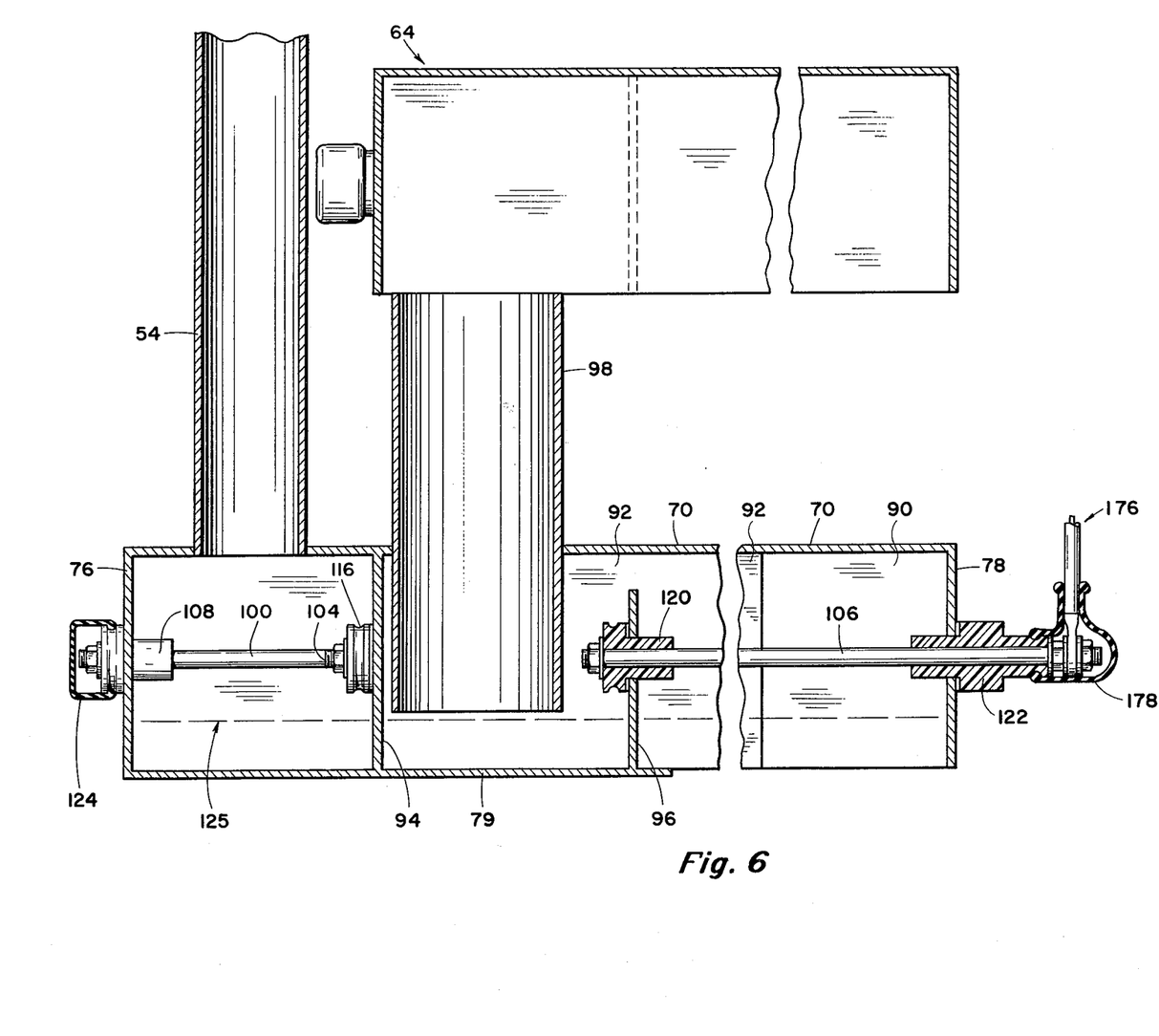
FIG. 6 is a sectional elevational view depicting the electrode attachment to the trays and the means for controlling the level of the oil/water interface.

Each of the tray channels 80, 82, 84 and 86 are provided with centrally disposed elongated electrodes 100, 102, 104, and 106, respectively, extending therethrough (FIG. 3). The electrode 100 which is within the tray channel 80 is connected at each end to the end walls 76 and 78 through insulator sleeves 108 and 110, respectively, to insure that the said electrode does not touch the said tray end walls. The electrode 102 which is disposed within the tray channel 82 and is connected at each end to the partition plate 94 and the end wall 78 through oppositely disposed insulator sleeved 112 and 114, respectively. Likewise, the electrode 104 is secured between the plate 94 and the end wall 78 by means of insulator sleeves 116 and 118, respectively, and electrode 106 is secured between the baffle 96 and end plate 78 by means of a pair of insualtor sleeves 120 and 122, respectively. The outer end of the electrode 100 adjacent to the end wall 76 is provided with an insulator cap 124 (FIG. 6) to prevent the electrode 100 from being exposed to the exterior of the tray means 62 which is surrounded by water.

An elongated transversely disposed bottom plate 79 is secured along the bottom of the tray means 62 on one end thereof adjacent to the end wall 76 so that the oil-water emulsion flowing downwardly into the said tray 62 via the pipes 54, 56, 58 and 60 will not escape from the said tray means but will be diverted horizontally along the tray channel 80.

Therefore, when the heated oil-water emulsion from the separator compartment 20 flows through the pipes 54, 56, 58 and 60, into the tray means 62, the oil-water emulsion flows or is carried by the water which completely surrounds the tray means 26 and flows along the tray channel 80, around the end of the partition plate 88 and back along the tray channel 82, around the end of the partition plate 90 and along the tray channel 84. The emulsion then flows around the partition plate 92 back along the tray channel 86 until it reaches the baffle 96. The cleaner uppermost part of the oil-water emulsion then flows over the baffle plate 96 and into the subcompartment formed between the said baffle plate 96 and end plate 94. The onflow of oil then forces that oil to flow upwardly through the riser pipe 98 into the tray means 64 located thereabove.

Care is taken to insure that the oil-water interface generally indicated by reference character 125 (FIG. 6) remains below the level of the electrodes 100, 102, 104 and 106 to prevent any shorting of the said electrodes through the water. This is substantially insured by locating the lower end of the riser pipe 98 below the level of the electrode which is connected to the baffle plate 96.

The tray means 64 is similar to the tray means 62 and is provided with an upper horizontally disposed plate 126, a pair of oppositely disposed downwardly extending side walls 128 and 130 (FIG. 2) and a pair of oppositely disposed end walls 132 and 134. Three elongated downwardly extending partition plates 136, 138 and 140 divide the said tray means 64 into four longitudinally disposed tray flow channels 142, 144, 146 and 148, respectively. The said partition plates 136 and 140 are secured at one end thereof to the end plate 132 while the partition plate 138 is secured at one end thereof to the end plate 134, thereby allowing the oil-water emulsion to flow along the tray channel 142 around the partition plate 136, through the tray channel 144 around the partition plate 138 through the tray channel 146 around the partition plate 140 and along the tray channel 148 to a baffle member (not shown) which is substantially identical to the baffle member 96 in the tray means 62. The riser pipe 98 extends upwardly from the tray means 62 into open communication with the tray channel 142 adjacent to the end wall 132.

Each of the tray channels 142, 144, 146 and 148 is provided with a centrally disposed elongated elongated electrode means 150, 152, 154 and 156, respectively, the said electrodes being insulated from the tray means in a manner similar to that of the electrodes of the tray means 62. A riser pipe 158 extends downwardly through the tray plate 126 into the tray channel 148 adjacent to the baffle plate thereof and extends upwardly into open communication with the tray means 66 located directly above the said tray means 64.

The tray means 66 is substantially identical to the tray means 64 and is provided with a plurality of tray channels for routing the oil-water emulsion back and forth therealong and subsequently into a riser pipe 160 which extends from the tray means 66 upwardly in open communication with the tray means 68 located directly above the said tray means 66. The tray means 68 is substantially identical to the tray means 64 and 66 and is likewise provided with a plurality of tray channels for flowing the oil-water emulsion therethrough, the said oil-water emulsion being continuously exposed to an electrostatic field created between the electrodes and the tray means for stripping the ionized water particles from the oil. The tray means 68 is provided with a riser pipe 162 whereby the oil, after being flowed through the tray means 68 may escape and rise above the primary oil water interface generally depicted by reference character 163.

A horizontally disposed perforated baffle plate or screen 164 is located in the upper portion of the container 12 whereby any gases present in the oil may pass through the baffle 164 and out of the container 12 to the mist extractor 46. An oil outlet means 166 is secured to the end plate 16, whereby the treated oil may be removed from the container 12.

A power supply 168 is disposed adjacent to or on the container 12 and may be connected directly to an available A.C. power source (not shown). The power supply 168 converts the A.C. power into high voltage D.C. power having a positive outlet terminal 170 and a negative ground output terminal 172. The negative output terminal 172 is connected directly to the container 12 which in turn connects the negative power to the tray means 62, 64, 66 and 68 through the vertically disposed standard 63 within the container 12. The positive terminal 170 of the power supply 168 is connected through the container 12 by means of an insulating sleeve 174 and connected directly to the longitudinally disposed electrodes within the tray means 62, 64, 66 and 68 via insulated sleeve means generally indicated by reference character 176. Since the outer portion of the oil wash tray means 26 is exposed primarily to water, the said water usually having high salt content, it is imperative that the electrode means and the insulated cable 176 thereto be fully insulated to prevent any shorting of the power thereon to the tray means through the water. Hence, insulators 178 (FIG. 6) are disposed over the connections between the electrodes and the cable 176 to prevent the said electrodes or the wire attached thereto from being exposed directly to the water inside the container 12.

In operation the oil-water mixture containing oil-water emulsion is pumped into the treater 10 through pipe 32 and free water is separated. Free water is separated here in separation section 20 so it will not have to be heated, thus conserving fuel. The oil-water emulsion from compartment 20 is then passed through heat exchange pipes 54, 56, 58 and 60 over the furnace where it is heated. In addition the water is heated in compartment 22 which keeps the emulsion hot for better separation.

As the oil-water emulsion flows into and through the tray means 62 it is exposed to an electrostatic field created between the electrodes therein and the tray means which creates the process of stripping out the ionized water particles from the oil. As hereinbefore set forth the flow of the oil-water emulsion through the said tray means creates a turbulent flow around the edges thereof which causes coalescence of water particles, which are trapped in the oil, into larger globules of water, the globules of water then descending into the water and separating from the oil. The cleaner oil from the tray means 62 is then routed upwardly into the tray means 64 whereby the same process is repeated as the oil flows back and forth through the said tray means 64. The oil-water emulsion from the tray means 64 is then routed through the tray means 66 and then the tray means 68 whereby the cleaner oil which is greatly dehydrated rises out of the tray means 68 where it is extracted from the container via the oil outlet 166. Excess water which accumulates in the separator compartment 20, and in the electrostatic treater compartment may then be siphoned off by ordinary siphon means (not shown) or may be drained from the container 12 via means 67 depicted in FIG. 1.

Referring now to FIG. 4 reference character 62A generally indicates a second configuration for the tray means 62 as depicted in FIG. 3. The exterior configuration of the tray means 62A is substantially identical to that of 62 and where the component parts of the tray means 62A are identical to those of 62, the same character references have been utilized for clarity in describing the second configuration. The tray means 62A again comprises a horizontally disposed top plate 70 having side walls 72 and 74 for end walls 76 and 78. The oil-water emulsion pipes 54, 56, 58 and 60 are again secured to one end of the plate 70 in the same manner as hereinbefore set forth in description of the tray means 62.

In the case of the tray means 62A divider panels 88A, 90A and 92A again divide the underside of the tray 62A into four tray channels. However, in this case the divider panel 98 extends completely between the end walls 76 and 78 which in effect longitudinally divides the tray means 62 into two separate components. The divider plate 88A is connected to the divider panel 90A by means of a plate 180 adjacent to but spaced from the end plate 76. The opposite end of the divider plate 88A extends toward the opposite end wall 78 but is spaced therefrom so that the oil-water emulsion entering into the tray by means of the inlet pipes 58 and 60 will flow down the channel provided between the side wall 74 and the divider plate 88A around the divider plate 88A and back between the divider plate 88A and 90A. A baffle plate 182 is connected between the divider plates 88A and 90A adjacent to the plate 180, the said baffle plate 182 being substantially identical to the baffle plate 96 of the tray means 62. A riser pipe 184 extends through the top plate 70 adjacent to the plate 180 and the baffle 182 in a similar manner as to the riser pipe 98 in the tray means 62.

The second compartment on the opposite side of the divider plate 90A is substantially identical to that hereinbefore described, the divider plate 92A is secured at side wall 72 by means of a plate 186, the opposite end of the plate 92A extending toward the end wall 78 but spaced therefrom whereby an oil-water emulsion entering the tray means through the inlet pipes 54 and 56 will flow through the channel formed between the divider plates 90A and 92A around the end of the panel 92A and back between the plate 92A and the side wall 72 across the baffle 96 and upwardly through the riser pipe 98 to the tray above.

The electrode 100 is connected between the end walls 76 and 78 as in the tray means 62. The electrode 102A extends from the end wall 78 to the baffle plate 182, the electrode 104A extending between the end walls 76 and 78 and the electrode 106 extending between the end wall 78 and the baffle plate 96.

Each of the trays which are spaced above the tray means 62A is configured in a like manner having been divided longitudinally in half by divider plates similar to that of 90A, each side thereof having two channels for which the oil-water emulsion may flow before exiting through riser pipes into the next subsequent tray above. It is readily apparent that the oil-water emulsion in this configuration will flow at a volume rate twice that of the configuration depicted in FIG. 3 wherein the retention time or exposure time to the electrostatic field will be only half of that as described in relation to the configuration of FIG. 3. This tray configuration will be particularly useful in cases where the water content in the oil-water emulsion is not great and where volume requirements are higher.

Referring now to FIG. 5 reference character 62B depicts a third configuration of the tray means 62, the components thereof which are common to those of the tray means 62 and 62A having the same reference characters for ease in description. The tray means 62B again provides a horizontally disposed top plate 70 having downwardly extending side walls 72 and 74 and end walls 76 and 78. The oil-water emulsion inlet pipes 54, 56, 58 and 60 are connected through one end of the top plate 70 in the same manner as hereinbefore described. In this case the partition plates 88B, 90A and 92B are longitudinally disposed and connected between the end walls 76 and 78 which forms four distinct longitudinally disposed channels therebetween.

A baffle plate 190 is secured between the side wall 74 and the divider plate 88B adjacent to and spaced from the end wall 78. A second substantially identical baffle plate 192 is secured between the divider plates 88B and 90A adjacent to the end wall 78, whereas a third baffle plate 194 is secured between the divider plates 90A and 92B and a fourth substantially identical baffle plate 196 is secured between the divider plate 92B and side wall 72.

Four riser pipes 198, 200, 202 and 204 are disposed through the top plate 700 adjacent to the end wall 78 as depicted in FIG. 5. Elongated electrodes 206, 208, 210 and 212 are secured between the end wall 76 and the baffle plates 190, 192, 194 and 196, respectively. It is noted that in the configuration shown in FIG. 5 it will be necessary to connect the ends of the electrodes which are attached to the end wall 76 of the tray to the power supply 168 on the first and third tray means since the opposite ends of said electrodes are attached to the baffle plates 190, 192, 194 and 196.

Each of the subsequent trays disposed above the tray means 62B will be similarly configured with four separate elongated longitudinally disposed channels therein thereby the oil-water emulsion entering the tray means 62B via the inlet pipes 54, 56, 58 and 60 will flow directly along their respective channels across the baffle plates near the opposite end thereof and upwardly through the riser pipes into the next subsequent tray means. It is also readily apparent that the tray means 62B will have four times the volume capacity as that of 62 but will have only one-fourth of the exposure time of the said oil-water emulsion to the electrostatic field. The tray means 62B is therefore particularly useful in treating or dehydrating an oil-water emulsion having low water content therein and wherein there is a high volume output requirement.

From the foregoing it will be apparent that the present invention provides an electrostatic wet oil treater which may be configured to adjust the retention time or exposure time of the oil-water emulsion to a strong electrostatic field. However, the highest volume output configuration still provides for a greater exposure time of the oil-water emulsion to the electrostatic field than that of the prior art and the separating effect of turbulent flow through the trays provides a highly efficient separating process.

Whereas the present invention has been described with particular relation to the drawings attached hereto, it is obvious that other and further modifications apart from those shown or suggested herein may be made within the spirit and scope of this invention.

What is claimed is:

1. An electrostatic wet oil treater apparatus for use in separating water from an oil-water emulsion, said apparatus comprising a container, oil wash tray means disposed within the container, said tray means comprising an upper plate and downwardly depending side walls to create a flow channel for said emulsion, oil-water emulsion inlet means disposed within the container means and operably connected to the tray means for flowing said oil-water emulsion into the tray means, electrode means carried by the tray means and insulated therefrom, said electrode means being disposed in said flow channel in contact with the oil-water emulsion flowing the said tray means, power means connected to the electrode means and the tray means for providing an electrostatic field through the oil water emulsion for separating the ionized water particles from the oil, oil level control means carried by the tray means for maintaining the oil and water interface in said flow channel below the electrode means, oil outlet means in communication with the tray means for removing the oil therefrom and water outlet means in communication with the tray means for removing the water therefrom.

2. An electrostatic wet oil treater apparatus as set forth in claim 1 wherein the container includes a heater oil treating apparatus having a furnace and heat exchange means for raising the temperature of the oil-water emulsion to be treated therein.

3. An electrostatic wet oil treater apparatus as set forth in claim 1 wherein said oil wash tray means includes at least one wash tray having an upper plate, a plurality of downwardly extending side walls therearound, a plurality of spaced elongated divider panels depending from said upper plate within each tray for creating a plurality of flow channels for the oil-water emulsion to flow therethrough and electrodes and power means as set forth in claim 1 disposed in each of said flow channels.

4. An electrostatic wet oil treater apparatus as set forth in claim 3 wherein said electrode means comprises an elongated electrode rod longitudinally disposed in each flow channel, said electrodes being secured to the side walls of the trays and insulated therefrom and insulated cabling operably connecting said electrode means to the power means.

5. An electrostatic wet oil treater apparatus as set forth in claim 1 wherein the oil level control means comprises a subcompartment formed at the end of said flow channel surrounding and substantially enclosing said oil level control means, said subcompartment defined by a bottom plate, attached to said side walls, a baffle plate extending upward from the bottom plate and across said flow channel leaving a space between said upper plate and said baffle plate whereby oil and-/or oil-water emulsion flows over said baffle plate into said subcompartment and thence into said oil level control means comprising at least one riser pipe for removing the oil and oil-water emulsion from each wash tray, one end of said pipe extending downwardly through the upper plate of each wash tray to a point within the wash tray below the electrode disposed therein.

6. An electrostatic wet oil treater apparatus as set forth in claim 2 wherein the oil wash tray means comprises a plurality of vertically spaced wash trays each said tray having an upper plate, a plurality of downwardly extending sidewalls therearound, spaced divider panels disposed within each tray for creating a plurality of flow channels for the oil and oil-water emulsion to flow therethrough, electrodes disposed in each flow channel, and means adapted to retain water around the tray means for floating the said oil and oil-water emulsion within the tray means, and the oil-water emulsion inlet means disposed adjacent to the treating apparatus furnace for preheating the oil and oil-water emulsion before entering the wash tray means.

7. An electrostatic wet oil treater apparatus as set forth in claim 6 wherein there are three divider panels provided in each wash tray for creating four elongated flow channels therethrough, an elongated electrode rod longitudinally disposed in each flow channel, said electrode being secured to the side walls of the trays and insulated therefrom, and insulated cabling operably connecting said electrode means to the power means.

8. An electrostatic wet oil treater apparatus as set forth in claim 7 wherein the first and third divider panels are secured at one end thereof to a first tray side wall, the opposite ends thereof being spaced from the opposite side wall, the second said divider panel being secured at one end thereof to the opposite side wall, the other end of said second divider panel being spaced from the first side wall for creating four interconnecting flow channels, the first said flow channel of the first wash tray being operably connected to the oil-water emulsion inlet means and the fourth flow channel being provided with oil level control means comprising a riser pipe for removing the oil and oil-water emulsion from the wash tray, one end of the said riser pipe extending downwardly through the upper plate of the said tray to a point below the electrode means therein.

9. An electrostatic wet oil treater apparatus as set forth in claim 8 wherein the said riser pipe is operably connected to the first channel means of the next succeeding wash tray, the riser pipe from the last said tray being in open communication with the oil outlet means.

10. An electrostatic wet oil treater apparatus as set forth in claim 7 wherein the first and third divider panels are secured at one end thereof to a first side wall of the wash tray, the opposite ends thereof being spaced from the opposite sidewall of the wash tray and wherein the second divider panel is secured at each end thereof to the tray sidewalls for creating two continuous alternating flow channels, the first flow channel of said alternating flow channel of the first wash tray being operably connected to the oil-water emulsion inlet means and the second flow channel of each alternating flow channel being provided with oil level control means comprising a riser pipe for removing the oil and oil-water emulsion from the tray, one end of said riser pipe extending downwardly through the upper plate of the wash tray to a point below the electrode means disposed therein.

11. An electrostatic wet oil treater apparatus as set forth in claim 10 wherein each riser pipe is operably connected to the first flow channel of both alternating flow channels of the next succeeding wash tray, the riser pipes from the last said tray being in open communication with the oil outlet means.

12. An electrostatic wet oil treater apparatus as set forth in claim 8 wherein each divider panel is secured at each end thereof to opposite side walls of the tray thereby creating four separate channels therealong, one end of each said channel of the first tray being operably connected to the oil-water emulsion inlet means, the opposite end of each said channel being provided with oil level control means comprising a riser pipe for removing the oil and oil-water emulsion from the tray, one end of said riser pipe extending downwardly through the upper plate of the wash tray to a point below the electrode means disposed therein.

13. An electrostatic wet oil treater apparatus as set forth in claim 12 wherein each riser pipe is operably connected to the flow channels of the next succeeding wash tray, the riser pipes of the last tray being in open communication with the oil outlet means.

14. A submersible oil-water emulsion wash tray comprising an upper plate having downwardly extending side walls secured around the edges thereof to create a flow channel for the oil-water emulsion to flow therethrough, emulsion inlet means provided at one end of said flow channel and outlet means provided at the opposite end thereof, said outlet comprising an oil level control and outlet means, a subcompartment surrounding and substantially enclosing said oil level control and outlet means, said subcompartment defined by a bottom plate attached to said side walls, a baffle plate extending upward from said bottom plate and across said flow channel leaving a space between said upper plate and said baffle plate whereby oil and/or oil-water emulsion flows over said baffle plate into said subcompartment and thence into said outlet, and means to submerse said tray in a heavier than oil liquid provided around the tray for floating the oil and oil-water emulsion adjacent said upper plate within said tray.

15. A submersible oil-water emulsion wash tray as set forth in claim 14 wherein the divider panels are arranged for interconnecting alternate ends of the flow channels for creating at least one alternating flow channel.

16. A submersible oil-water emulsion wash tray as set forth in claim 14 wherein an electrode is disposed within each flow channel, and an electrical power supply is operably connected between the tray and the electrode for providing an electrostatic field through the oil-water emulsion for separating the ionized water particles from the oil and wherein the outlet means comprises at least one riser pipe having the lower end thereof disposed within the tray at a point below the electrode for maintaining the oil and water interface below the level of the electrode.

* * * * *